US010544048B2

(12) United States Patent
Yang et al.

(10) Patent No.: US 10,544,048 B2
(45) Date of Patent: Jan. 28, 2020

(54) WATERBORNE AEROGEL AND METHOD FOR PRODUCING SAME

(71) Applicant: LG Chem, Ltd., Seoul (KR)

(72) Inventors: Young-In Yang, Daejeon (KR); Young-Sam Kim, Daejeon (KR); Kyoung-Shil Oh, Daejeon (KR); Ye-Hon Kim, Daejeon (KR)

(73) Assignee: LG Chem, Ltd. (KR)

( * ) Notice: Subject to any disclaimer, the term of this patent is extended or adjusted under 35 U.S.C. 154(b) by 263 days.

(21) Appl. No.: 15/311,617

(22) PCT Filed: Oct. 14, 2015

(86) PCT No.: PCT/KR2015/010868
§ 371 (c)(1),
(2) Date: Nov. 16, 2016

(87) PCT Pub. No.: WO2016/104927
PCT Pub. Date: Jun. 30, 2016

(65) Prior Publication Data
US 2017/0081200 A1 Mar. 23, 2017

(30) Foreign Application Priority Data
Dec. 23, 2014 (KR) .................. 10-2014-0186685

(51) Int. Cl.
C01B 33/157 (2006.01)
C01G 23/047 (2006.01)
C01F 7/02 (2006.01)
C01B 33/152 (2006.01)
(Continued)

(52) U.S. Cl.
CPC ........... *C01B 33/157* (2013.01); *B01J 20/103* (2013.01); *B01J 20/22* (2013.01); *C01B 33/152* (2013.01); *C01F 7/02* (2013.01); *C01G 23/047* (2013.01); *C01P 2004/61* (2013.01);
(Continued)

(58) Field of Classification Search
CPC .......................... C01B 33/157; C01B 33/159
See application file for complete search history.

(56) References Cited

U.S. PATENT DOCUMENTS 2,786,042 A * 3/1957 Iler .................. B82Y 30/00
516/79
4,595,578 A 6/1986 Cohen et al.
5,795,557 A 8/1998 Pajonk et al.
(Continued)

FOREIGN PATENT DOCUMENTS

CN    1891626 A    1/2007
CN  100574863 C   12/2009
(Continued)

OTHER PUBLICATIONS

Wang et al. Adv. Mater. 2007, 19, 3423-3424.*
(Continued)

*Primary Examiner* — Michael A Salvitti
(74) *Attorney, Agent, or Firm* — Lerner, David, Littenberg, Krumholz & Mentlik, LLP

(57) ABSTRACT

Disclosed is a water-dispersed aerogel, having an eco-friendly composition that contains an organic solvent in a decreased amount while increasing ease of use of aerogel microparticles in a liquid phase and a method of manufacturing the water-dispersed aerogel is also provided.

18 Claims, 2 Drawing Sheets

(51) Int. Cl.
  *B01J 20/10* (2006.01)
  *B01J 20/22* (2006.01)
(52) U.S. Cl.
  CPC ...... *C01P 2004/62* (2013.01); *C01P 2004/64* (2013.01); *C01P 2006/12* (2013.01)

(56) References Cited

U.S. PATENT DOCUMENTS

| | | | |
|---|---|---|---|
| 9,834,450 B2* | 12/2017 | Ishihara | C01G 25/00 |
| 2003/0215640 A1* | 11/2003 | Ackerman | B01J 13/0091 |
| | | | 428/405 |
| 2007/0003701 A1 | 1/2007 | Yoshitake et al. | |
| 2010/0285317 A1 | 11/2010 | Meier et al. | |
| 2012/0065312 A1* | 3/2012 | Ishihara | B82Y 30/00 |
| | | | 524/403 |
| 2012/0142845 A1* | 6/2012 | De Winter | C09C 1/3684 |
| | | | 524/525 |
| 2012/0225003 A1* | 9/2012 | Joung | C01B 33/158 |
| | | | 423/338 |
| 2013/0030098 A1 | 1/2013 | Megaridis et al. | |
| 2013/0189521 A1 | 7/2013 | Fukuju et al. | |
| 2013/0296596 A1* | 11/2013 | Suh | C07F 7/188 |
| | | | 556/457 |
| 2017/0081200 A1* | 3/2017 | Yang | C01G 23/047 |

FOREIGN PATENT DOCUMENTS

| | | |
|---|---|---|
| CN | 102217005 A | 10/2011 |
| CN | 102433041 A | 5/2012 |
| CN | 102876147 A | 1/2013 |
| EP | 2428491 A1 | 3/2012 |
| JP | S62502257 A | 9/1987 |
| JP | H09124314 A | 5/1997 |
| JP | 2008013429 A | 1/2008 |
| KR | 20080101264 A | 11/2008 |
| KR | 20100092683 A | 8/2010 |
| KR | 101167269 B1 | 7/2012 |
| KR | 20130123942 A | 11/2013 |
| KR | 20140143292 A | 12/2014 |
| WO | 2012057086 A1 | 5/2012 |

OTHER PUBLICATIONS

Min, Munhong, et al., "Application Properties of Ultra Light Weight Silica Aerogel to Polyurethane Membrane," Textile Coloration and Finishing, vol. 25, No. 4, Dec. 8, 2013, pp. 279-286. (English translation of Abstract only.).
Aravind, P.R., et al., "Mesoporous silica-alumina aerogels with high thermal pore stability through hybrid sol-gel route followed by subcritical drying." ScienceDirect, vol. 96, 2006, pp. 14-20.
International Search Report from PCT/KR2015/010868, dated Jan. 28, 2016.
Wang, Ding & Pfeffer, Robert, "Mixing and packing of binary hydrophobic silica aerogels", Powder Technology, Nov. 14, 2012, vol. 235, pp. 975-982.
Supplementary European Search Report for Application No. EP15873455.8, dated Nov. 7, 2017.
Taiwan IPO Search Report dated Dec. 13, 2016.

\* cited by examiner

WATERBORNE AEROGEL AND METHOD FOR PRODUCING SAME

CROSS REFERENCE TO RELATED APPLICATION

The present application is a national phase entry under 35 U.S.C. § 371 of International Application No. PCT/KR2015/010868 filed Oct. 14, 2015, published in Korean, which claims priority from Korean Patent Application No. KR 10-2014-0186685, filed Dec. 23, 2014, all of which are incorporated herein by reference.

BACKGROUND OF THE INVENTION

1. Technical Field

The present invention relates to a water-dispersed aerogel and a method of manufacturing the same and, more particularly, to a water-dispersed aerogel, which has an eco-friendly composition that contains an organic solvent in a decreased amount while increasing ease of use of aerogel microparticles in a liquid phase, and to a method of manufacturing the same.

2. Description of the Related Art

Silica aerogel in an ultrafine powder phase has a very low bulk density (about 0.04~0.1 g/cm$^3$), and the volume thereof is very large relative to the weight, thus increasing the transport cost and requiring a large space upon storage. Hence, workability may become poor and storage costs may increase. In particular, the case where silica aerogel in an ultrafine powder phase is used may undesirably generate dust, and thus the available applications of such an aerogel are limited. To solve these problems, research is ongoing into dispersion of silica aerogel in a liquid phase using an organic solvent. Although the silica aerogel dispersion solution in a liquid phase manufactured using an organic solvent is easily handled and the workability thereof may be improved, it may become gel due to dispersion instability upon long-term storage. Hence, a silica aerogel dispersion solution using an organic solvent has to be directly produced on-site. Further, when the silica aerogel dispersion solution using an organic solvent, as supplied from manufacturers, becomes a gel, the gelled silica aerogel has to be re-dispersed through treatment before use, which is regarded as disadvantageous in terms of process efficiency and profitability. To overcome the gelation of the silica aerogel dispersion solution using the organic solvent, an auxiliary agent such as an additive, a pH modifier, a surfactant, or a stabilizer may be used. In this case, however, inherent superhydrophobic and porous properties of the silica aerogel in an ultrafine powder phase may drastically change upon drying. Furthermore, the auxiliary agent is unlikely to be removed through treatment before the manufacturing process. If such removal is possible, economic benefits may be negated due to the additional process. Accordingly, there is required to develop a water-dispersed aerogel having an eco-friendly composition, which is in a liquid phase and is thus easily handled, and may be directly applied to the manufacturing process without the addition of an auxiliary agent to thereby improve profitability and workability.

SUMMARY OF THE INVENTION

Accordingly, the present invention has been made keeping in mind the problems encountered in the related art, and an object of the present invention is to provide a water-dispersed aerogel, which is in a liquid phase and may thus be easily handled and may possess high profitability and workability. The water-dispersed aerogel according to the present invention does not contain an auxiliary agent such as an additive, a pH modifier, a surfactant or a stabilizer, thus maintaining inherent superhydrophobic and porous properties of the aerogel microparticles upon drying. Also, this aerogel may be easily used because there is no gelation due to dispersion instability upon long-term storage, and may be directly applied to the manufacturing process without the need to remove the auxiliary agent through treatment before the manufacturing process. Furthermore, since the aerogel, which is in a conventional powder phase that is easily scattered due to low bulk density, is used in a liquid phase, it may be relatively easily added in a predetermined amount in the manufacturing process, and no dust is generated, thus protecting a work environment and the health of workers.

Another object of the present invention is to provide new applications of the water-dispersed aerogel having an eco-friendly composition in which the use of an organic solvent is decreased.

In order to accomplish the above objects, the present invention provides a water-dispersed aerogel, comprising: a mixture of water (A) and an organic solvent (B), and particles (C) having i) a BET specific surface area of 300~1500 m$^2$/g and ii) a porosity of 50% or more, wherein the mixture of water (A) and organic solvent (B) includes the water (A) and the organic solvent (B) at a weight ratio of 4:1~1:1, and the particles (C) are contained in an amount of 1~25 parts by weight based on 100 parts by weight of the mixture of water (A) and organic solvent (B).

In addition, the present invention provides a method of manufacturing a water-dispersed aerogel comprising a mixture of water (A) and an organic solvent (B), and particles (C) having i) a BET specific surface area of 300~1500 m$^2$/g and ii) a porosity of 50% or more, comprising: mixing the mixture of water (A) and organic solvent (B) with the particles (C) so that the particles (C) are dispersed in the mixture of water (A) and organic solvent (B), wherein the mixture of water (A) and organic solvent (B) includes the water (A) and the organic solvent (B) at a weight ratio of 4:1~1:1, and the particles (C) are contained in an amount of 1~25 parts by weight based on 100 parts by weight of the mixture of water (A) and organic solvent (B).

According to the present invention, a water-dispersed aerogel is in a liquid phase and can thus be easily handled and can exhibit high profitability and workability. Since the water-dispersed aerogel obviates the need for an auxiliary agent such as an additive, a pH modifier, a surfactant or a stabilizer, inherent superhydrophobic and porous properties of the aerogel microparticles upon drying can be maintained. Further, the aerogel can be easily used because there is no gelation due to dispersion instability upon long-term storage, and can be directly applied to the manufacturing process without the need to remove the auxiliary agent through treatment before the manufacturing process. Furthermore, since the aerogel, which is in a conventional powder phase that is easily scattered due to low bulk density, is used in a liquid phase, it can be relatively easily added in a predetermined amount in the manufacturing process, and no dust is generated, thus protecting a work environment and the health of workers. Moreover, new applications of the water-dispersed aerogel having an eco-friendly composition with an organic solvent in a decreased amount can be provided.

DESCRIPTION OF THE SPECIFIC EMBODIMENTS

Figure 1:
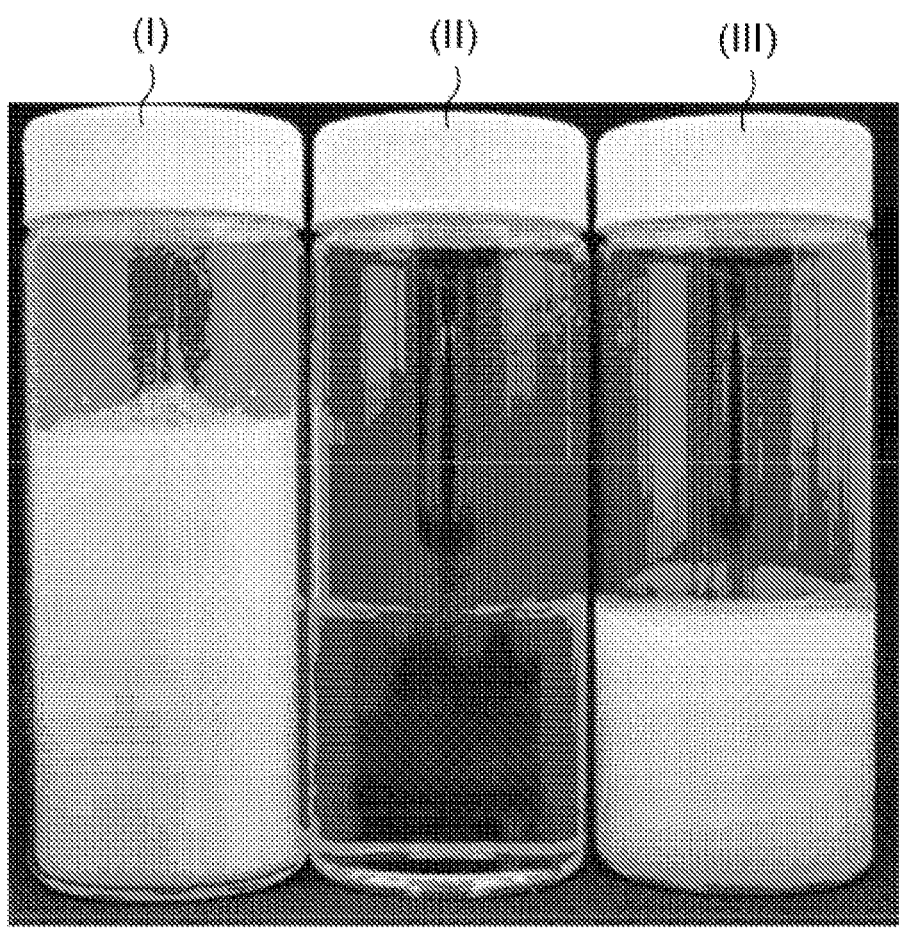
FIG. 1 illustrates (I) microparticles (C) according to the present invention, (II) a mixture of water (A) and isopropyl alcohol (IPA) (B) at a weight ratio of 1:1 as a dispersion solvent, and (III) the results (10 wt % concentration) of dispersion of the microparticles of (I) in the dispersion solvent of (II)

Hereinafter, a detailed description will be given of the present invention.

According to the present invention, a water-dispersed aerogel comprises a mixture of water (A) and an organic solvent (B), and particles (C) having i) a BET specific surface area of 300~1500 m$^2$/g and ii) a porosity of 50% or more, wherein the mixture of water (A) and organic solvent (B) includes the water (A) and the organic solvent (B) at a weight ratio of 4:1~1:1, and the particles (C) are contained in an amount of 1~25 parts by weight based on 100 parts by weight of the mixture of water (A) and organic solvent (B).

In the water-dispersed aerogel of the present invention, the mixture of water (A) and organic solvent (B) includes the water (A) and the organic solvent (B) at a weight ratio of 4:1~1:1. Although the aerogel is not physically mixed with water because of superhydrophobic and porous properties thereof, it may be easily dispersed in a solution even at weak stirring strength via gentle swirling by using a minimum amount of the organic solvent, especially isopropyl alcohol (IPA) in an embodiment of the invention. If the mixture includes the organic solvent in an amount greater than the above upper limit, dispersibility may increase for a short period of time, but stability may deteriorate, making it difficult to store due to gelation. In contrast, if the mixture includes the organic solvent in an amount less than the above lower limit, dispersion of the superhydrophobic aerogel becomes difficult. Given the above amount range of the organic solvent, the water-dispersed aerogel having an eco-friendly composition including the organic solvent in a lower amount may be variously applied.

The organic solvent (B) may include at least one selected from the group consisting of methanol, ethanol, acetone, isopropyl alcohol (IPA), propanol, butanol, pentanol, octanol, and isomers thereof. Particularly useful is isopropyl alcohol (IPA). Also, the mixture of water (A) and organic solvent (B) preferably includes the water (A) and the organic solvent (B) at a weight ratio of 2:1~1:1.

In an embodiment of the present invention, when using isopropyl alcohol (IPA), dispersion is efficiently performed even in the presence of high silica content, compared to when using the other organic solvents. Specifically, the dispersion solution comprising water and IPA at a weight ratio of 1:1 is stably maintained even after several weeks. Although phase separation occurs after a long period of time, re-dispersion becomes possible via gentle swirling. When 10 wt % of silica microparticles is dispersed in the dispersion solution comprising IPA and deionized (DI) water at 1:1, there is no color change in the dispersion solution.

The particles (C) are contained in an amount of 1~25 parts by weight based on 100 parts by weight of the mixture of water (A) and organic solvent (B). Given the above amount range of the particles (C), dispersion is efficiently carried out, and there is no gelation due to dispersion instability upon long-term storage. Hence, an auxiliary agent, such as an additive, a pH modifier, a surfactant, or a stabilizer is obviated to prevent the gelation, and thus inherent superhydrophobic and porous properties of the aerogel microparticles may be maintained upon drying. Accordingly, there is no need to remove the auxiliary agent through treatment before the manufacturing process, and the aerogel may be directly applied to the manufacturing process.

More specifically, the particles (C), which are contained in the water-dispersed aerogel according to the present invention, may include any component without limitation so long as it has the properties of i) and ii) as above. Specific examples thereof may include, but are not limited to, inorganic oxides, such as silica ($SiO_2$), alumina, titania ($TiO_2$), carbon, inorganic compounds, organic polymers, ion exchange resins, metals, metal salts, etc. Particularly useful is silica ($SiO_2$). The particles (C) may have a particle size ranging from 2 nm to 50 μm, and the particles have a BET specific surface area of 300~1500 m$^2$/g, preferably 500~1500 m$^2$/g, and more preferably 600~1500 m$^2$/g. Also, the particles may possess superhydrophobicity with a water contact angle of 125° or more, preferably 135° or more, and more preferably 140° or more. Also, the particles (C) may have a particle size ranging from 2 nm to 50 μm and superhydrophobicity with a water contact angle of 125° or more.

The particles have a porosity of 50% or more, and preferably 90% or more. Since the water-dispersed aerogel according to the present invention includes the particles having the properties as above, for example, when water is added to a superabsorbent polymer, agglomeration of the superabsorbent polymer may be remarkably decreased despite the use of the aerogel dispersion solution. Furthermore, even when the dispersion solution including a relatively small amount of particles compared to conventional silica is used, permeability of the superabsorbent polymer is improved. Also, a reduction in absorption under pressure (AUP) is curbed, anti-caking efficiency is increased, and high moisture content may be easily maintained.

In the present invention, a reduction in the contact angle of the water-dispersed aerogel is preferably 50% or less, and more preferably 10% or less, compared to the particles (C).

In addition, the present invention addresses a method of manufacturing the water-dispersed aerogel comprising a mixture of water (A) and an organic solvent (B) and particles (C) having i) a BET specific surface area of 300~1500 m$^2$/g and ii) a porosity of 50% or more, comprising: mixing the mixture of water (A) and organic solvent (B) with the particles (C) so that the particles (C) are dispersed in the mixture of water (A) and organic solvent (B), wherein the mixture of water (A) and organic solvent (B) includes the water (A) and the organic solvent (B) at a weight ratio of 4:1~1:1, and the particles (C) are contained in an amount of 1~25 parts by weight based on 100 parts by weight of the mixture of water (A) and organic solvent (B).

In the method of manufacturing the water-dispersed aerogel according to the present invention, the mixture of water (A) and organic solvent (B) includes the water (A) and the organic solvent (B) at a weight ratio of 4:1~1:1. Although the aerogel is not physically mixed with water due to superhydrophobic and porous properties thereof, it may be easily dispersed in a solution even at weak stirring strength via gentle swirling by using a minimum amount of an organic solvent, especially IPA in an embodiment of the invention. If the mixture includes the organic solvent in an amount greater than the above upper limit, dispersibility may increase for a short period of time, but stability may deteriorate, making it difficult to store due to gelation. In contrast, if the mixture includes the organic solvent in an amount less than the above lower limit, dispersion of the superhydrophobic aerogel becomes difficult. Given the above amount range of the organic solvent, the water-dispersed aerogel having an eco-friendly composition including the organic solvent in a lower amount may be variously applied.

The organic solvent (B) may include at least one selected from the group consisting of methanol, ethanol, acetone, IPA, propanol, butanol, pentanol, octanol, and isomers thereof. Particularly useful is IPA. Also, the mixture of water (A) and organic solvent (B) preferably includes the water (A) and the organic solvent (B) at a weight ratio of 2:1~1:1.

In an embodiment of the present invention, the use of IPA enables the dispersion process to be efficiently carried out even in the presence of high silica content, compared to when using the other organic solvents. Specifically, the dispersion solution comprising water and IPA at a weight ratio of 1:1 is stably maintained even after several weeks. Although phase separation occurs after a long period of time, re-dispersion becomes possible via gentle swirling. Further, when 10 wt % of silica microparticles is dispersed in the dispersion solution comprising IPA and DI water at 1:1, no color change of the dispersion solution may result.

The particles (C) are contained in an amount of 1~25 parts by weight based on 100 parts by weight of the mixture of water (A) and organic solvent (B). Given the above amount range of the particles (C), dispersion efficiently progresses, and there is no gelation due to dispersion instability upon long-term storage. Hence, an auxiliary agent, such as an additive, a pH modifier, a surfactant or a stabilizer, need not be added to prevent the gelation, thus making it possible to maintain inherent superhydrophobic and porous properties of the aerogel microparticles upon drying. Accordingly, the resulting aerogel may be directly applied to the manufacturing process without the need to remove the auxiliary agent through treatment before the manufacturing process.

More specifically, the particles (C), which are used in the method of manufacturing the water-dispersed aerogel according to the present invention, may include any component without limitation so long as it has the properties of i) and ii) as above. Specific examples thereof may include, but are not limited to, inorganic oxides, such as silica ($SiO_2$), alumina, titania ($TiO_2$), carbon, inorganic compounds, organic polymers, ion exchange resins, metals, metal salts, etc. Particularly useful is silica ($SiO_2$). The particles (C) may have a particle size ranging from 2 nm to 50 μm, and may also possess a BET specific surface area of 300~1500 $m^2/g$, preferably 500~1500 $m^2/g$, and more preferably 600~1500 $m^2/g$. Also, the particles have superhydrophobicity with a water contact angle of 125° or more, preferably 135° or more, and more preferably 140° or more. Also, the particles (C) may have a particle size ranging from 2 nm to 50 μm and superhydrophobicity with a water contact angle of 125° or more.

The particles have a porosity of 50% or more, and preferably 90% or more. Since the method of manufacturing the water-dispersed aerogel according to the present invention includes the particles having the properties as above, for example, when water is added to a superabsorbent polymer, agglomeration of the superabsorbent polymer may be remarkably decreased despite the use of the aerogel dispersion solution. Also, even when the dispersion solution including a relatively small amount of particles compared to conventional silica is used, permeability of the superabsorbent polymer is improved. Also, AUP reduction is curbed, anti-caking efficiency is increased, and high moisture content may be easily maintained.

In the method of manufacturing the water-dispersed aerogel according to the present invention, a reduction in the contact angle of the water-dispersed aerogel is preferably 50% or less, and more preferably 10% or less, compared to the particles (C).

A better understanding of the present invention may be obtained via the following examples that are set forth to illustrate, but are not to be construed as limiting the scope of the present invention. The scope of the present invention is shown in the claims, and also contains all modifications within the meaning and range equivalent to the claims. Unless otherwise mentioned, "%" and "part" showing the amount in the following examples and comparative examples refers to a mass basis.

EXAMPLES

As porous superhydrophobic microparticles, an Aerogel (available from JIOS) was dispersed in an aqueous solution using a dispersion aid, that is, an organic solvent. The porous superhydrophobic aerogel microparticles had an average particle size of 5 μm, a BET specific surface area of 720 $m^2/g$, a water contact angle of 144°, and a porosity of 95%. The particle size of the Aerogel was measured through Laser Diffraction using HELOS (Helium-Neon Laser Optical System) based on ISO 13320. The specific surface area thereof was measured using a BET meter (Micromeritics 3Flex). The porosity thereof was determined from the tap density ($\rho_t$) and the true density ($\rho_s$) of Equation 1 below.

$$\text{Porosity (\%)} = (1 - \rho_t/\rho_s) \ast 100 \quad \text{[Equation 1]}$$

In order to measure the true density, a pycnometer (Accupyc II 1340) was used, and the tap density was measured using a volumeter (Engelsmann Model STAY II).

The water contact angle was measured using a contact angle analyzer (KRUSS DSA100), and was specifically determined in a manner in which double-sided tape was attached to a flat glass plate, microparticles were applied in a monolayer thereon, and then 5 μL of ultrapure water was placed in the form of drop on the monolayer, and the angle between the water drop and the glass plate was measured four times and averaged.

Figure 2:
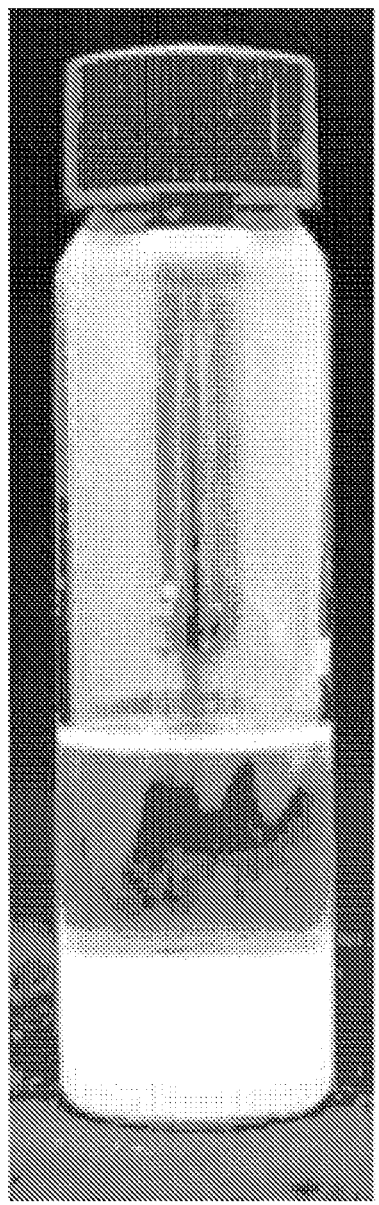
FIG. 2 illustrates phase separation and gelation, 24 hr after dispersion of microparticles using only an organic solvent.

In dispersion solutions comprising water and methanol, ethanol, IPA and acetone in various amounts, the porous superhydrophobic aerogel microparticles were dispersed, after which the extent of dispersion thereof was checked. When the organic solvent was used alone to disperse the porous superhydrophobic aerogel microparticles, without the use of water, efficient dispersion was initially observed in all of organic solvents. After 24 hr, however, phase separation and gelation occurred, as illustrated in Table 1 and FIG. 2. Upon dispersion using IPA among the organic solvents, when silica content was increased to 20 wt % from 10 wt %, stickiness was increased but dispersion was efficiently carried out compared to when using the other organic solvents, as is apparent from the results of Table 1 below.

TABLE 1

Dispersion of 10 wt % and 20 wt % of hydrophobic porous silica in organic solvent

| Organic solvent | Dispersion at 10 wt % | | Dispersion at 20 wt % | |
|---|---|---|---|---|
| | 0 hr | After 24 hr | 0 hr | After 24 hr |
| MeOH | ○ | Phase separation | X | X |
| EtOH | ○ | Phase separation & Gelation | X | X |
| IPA | ○ | Phase separation & Gelation | Δ | Δ |
| Acetone | ○ | Phase separation & Gelation | X | X |

○: good dispersion
Δ: fair (hydrophobic porous silica powder is not present)
X: no dispersion When the porous superhydrophobic aerogel microparticles were dispersed with the mixture of water and organic solvent having the composition as shown in Table 2 below, the dispersion solution using the mixture of water and IPA at a weight ratio of 1:1 was stable even after several weeks. Although phase separation took place after a long period of time, re-dispersion efficiently occurred via gentle swirling.

The dispersion was efficiently performed under conditions of IPA and DI water at a weight ratio of 1:2, but ease of use of the resulting solution was decreased due to high stickiness. Hence, the ratio of 1:1 was determined to be the most appropriate. Specifically, FIG. 1 illustrates (I) porous superhydrophobic microparticles (C) according to the present invention, (II) a mixture of water (A) and IPA (B) at a weight ratio of 1:1 as a dispersion solvent, and (III) illustrates the results (10 wt % concentration) of dispersing the porous superhydrophobic microparticles of (I) in the dispersion solvent of (II). Based on the results of observation of the dispersion stability for one month or more, the color of the dispersion solution turned to yellow when using acetone. However, when 10 wt % of the porous superhydrophobic aerogel microparticles was dispersed in the dispersion solution of IPA and DI water at a weight ratio of 1:1, the color of the dispersion solution was not changed.

TABLE 2

Dispersion of hydrophobic porous silica in (water + organic solvent)

| Organic solvent | Water:Organic solvent (mass ratio) | Dispersion at 10 wt % | | Dispersion at 5 wt % | |
|---|---|---|---|---|---|
| | | 0 hr | After 24 hr | 0 hr | After 24 hr |
| MeOH | 1:1 | Δ | Δ | ○ | Phase separation |
| EtOH | 2:1 | ○ | Δ | Δ | Phase separation |
| | 1:1 | ○ | Δ | ○ | Phase separation |
| IPA | 4:1 | Δ | Δ | ○ | Phase separation |
| | 3:1 | Δ | Δ | ○ | Phase separation |
| | 2:1 | ○ | ○ | ○ | Phase separation |
| | 1:1 | ○ | ○ | ○ | Phase separation |
| Acetone | 2:1 | Δ | Δ | ○ | Phase separation |
| | 1:1 | ○ | Δ | ○ | Phase separation |

○: good dispersion
Δ: fair (hydrophobic porous silica powder is not present)
X: no dispersion As is apparent from the results of Tables 1 and 2, the dispersion stability over time was increased when using both the water and the organic solvent to disperse the porous superhydrophobic aerogel microparticles, compared to when using the organic solvent alone.

COMPARATIVE EXAMPLES

Comparative Example 1

When a fluid that is pressurized to ultrahigh pressure is passed through a fine orifice module, an ultrasonic flow rate is generated depending on a drastic reduction in pressure. Using a high pressure homogenizer for subjecting the particles to impact, cavitation, turbulence and shear so as to be dispersed at the ultrasonic flow rate, the same porous superhydrophobic aerogel microparticles as in the above example were dispersed in water at a maximum pressure of 22,000 psi. As such, such particles appeared to be temporarily dispersed, but phase separation between the water and the superhydrophobic microparticles was immediately caused.

Comparative Example 2

Porous superhydrophobic aerogel microparticles were dispersed in an aqueous solution using a surfactant as a dispersion aid. The same porous superhydrophobic aerogel microparticles as in the above example were used, and the surfactant was sodium dodecylsulfate (SDS) and Triton™ X-100. For dispersion, stirring was performed at a rate of 2,000 rpm for 1 hr using a magnetic bar. As for SDS, a 1 M aqueous solution was prepared, and the porous superhydrophobic aerogel microparticles were dispersed at a concentration of 5 wt % therein. In a 0.1 M SDS solution, the porous superhydrophobic aerogel microparticles were not dispersed, but floated on the solution. As for Triton™ X-100, a 0.25 M aqueous solution was prepared, and the porous superhydrophobic aerogel microparticles were dispersed at a concentration of 5 wt % therein.

Test Example

Using a contact angle meter, inherent contact angle of silica as porous superhydrophobic microparticles was measured. The water contact angle was measured using a contact angle analyzer (KRUSS DSA100), and was specifically determined in a manner in which double-sided tape was attached to a flat glass plate, microparticles were applied in a monolayer thereon, and then 5 μL of ultrapure water was placed in the form of drop on the monolayer, and the angle between the water drop and the glass plate was measured four times and averaged.

The porous superhydrophobic silica microparticles were dispersed as in the above example, and dried, after which the contact angle thereof was measured. To dry samples, each sample was placed in an oven at 50° C. and allowed to stand for one day. By measuring the contact angle, changes in hydrophobic properties of the porous superhydrophobic aerogel microparticles before and after dispersion were checked. The results are shown in Table 3 below.

Consequently, there was little change in hydrophobic properties of the porous superhydrophobic aerogel microparticles dispersed in the mixture of water and IPA. On the other hand, upon dispersion using the surfactant and then drying, the contact angle was drastically decreased. Based on the above results, inherent hydrophobic properties of the porous superhydrophobic aerogel microparticles were not maintained upon dispersion using the surfactant. Also, when the aerogel was dispersed using water and IPA, it was scattered again in a powder phase after drying, from which the original powder phase thereof can be confirmed to be maintained. In two cases using the surfactant as in Comparative Example 2, the powder was agglomerated in a solid phase, and thus porous properties disappeared.

TABLE 3

Measurement of contact angle

| Sample | Contact angle (degree) |
|---|---|
| Hydrophobic porous silica | 144° |
| (Hydrophobic porous silica/water + IPA) dispersion and then drying | 143° |
| (Hydrophobic porous silica/water + Triton X-100) dispersion and then drying | 60° |
| (Hydrophobic porous silica/water + SDS) dispersion and then drying | 29° |

Measurement of contact angle using 5 μL of DI water
DM-30S contact angle: 133°

Based on the above results, the water-dispersed aerogel according to the present invention is easy to handle as a liquid, and has high profitability and workability. Also, there is no gelation due to dispersion instability upon long-term storage, and thus the aerogel is easily stored and used. As porous superhydrophobic microparticles that are easily scattered in a conventional powder phase are used in a liquid phase, they may be relatively easily added in a predetermined amount in the manufacturing process and no dust is generated, thereby protecting a working environment and the health of workers. Moreover, the water-dispersed aerogel according to the present invention is manufactured without the use of an auxiliary agent such as an additive, a pH modifier, a surfactant or a stabilizer, thus maintaining inherent superhydrophobic and porous properties of the porous superhydrophobic microparticles upon drying. Since an auxiliary agent is not added upon manufacturing the water-dispersed aerogel of the present invention, removal of the auxiliary agent through pre-treatment is obviated, and the aerogel may be directly applied to the manufacturing process, effectively exhibiting work efficiency and shortening the process time. Therefore, the water-dispersed aerogel according to the present invention is applicable to superabsorbent polymers.

What is claimed is:

1. A water-dispersed aerogel, comprising:
   a mixture of water (A) and an organic solvent (B), and aerogel particles (C),
   wherein the aerogel particles (C) have a BET specific surface area of 300-1500 m$^2$/g, a porosity of 50% or more, and have superhydrophobicity with a water contact angle of 125° or more,
   wherein the mixture of water (A) and organic solvent (B) comprises the water (A) and the organic solvent (B) at a weight ratio of 4:1-1:1, and the aerogel particles (C) are contained in an amount of 1-25 parts by weight based on 100 parts by weight of the mixture of water (A) and organic solvent (B),
   wherein the water-dispersed aerogel does not contain a surfactant,
   wherein the aerogel particles (C) remain dispersed in the mixture of water (A) and organic solvent (B) after at least 24 hours, and
   wherein a reduction in contact angle of the aerogel particles (C), upon drying from the water dispersed aerogel, is 50% or less compared to the aerogel particles (C), prior to inclusion in the water-dispersed aerogel.

2. The water-dispersed aerogel of claim 1, wherein the aerogel particles (C) have a particle size ranging from 2 nm to 50 μm.

3. The water-dispersed aerogel of claim 1, wherein the aerogel particles (C) have a BET specific surface area of 500-1500 m$^2$/g.

4. The water-dispersed aerogel of claim 1, wherein the aerogel particles (C) have a porosity of 90% or more.

5. The water-dispersed aerogel of claim 1, wherein the aerogel particles (C) are at least one selected from the group consisting of silica (SiO$_2$), alumina, carbon, and titania (TiO$_2$).

6. The water-dispersed aerogel of claim 1, wherein the organic solvent (B) is at least one selected from the group consisting of methanol, ethanol, acetone, isopropyl alcohol (IPA), propanol, butanol, pentanol, octanol, and isomers thereof.

7. The water-dispersed aerogel of claim 1, wherein the mixture of water (A) and organic solvent (B) comprises the water (A) and the organic solvent (B) at a weight ratio of 2:1-1:1.

8. The water-dispersed aerogel of claim 1, wherein a reduction in contact angle of the aerogel particles (C), upon drying from the water-dispersed aerogel, is 10% or less compared to the aerogel particles (C), prior to inclusion in the water-dispersed aerogel.

9. A method of manufacturing a water-dispersed aerogel, comprising:
   mixing a mixture of water (A) and an organic solvent (B) with aerogel particles (C) so that the aerogel particles (C) are dispersed in the mixture of water (A) and organic solvent (B) to form the water-dispersed aerogel,
   wherein the mixture of water (A) and organic solvent (B) comprises the water (A) and the organic solvent (B) at a weight ratio of 4:1-1:1, and the aerogel particles (C) are contained in an amount of 1-25 parts by weight based on 100 parts by weight of the mixture of water (A) and organic solvent (B),
   wherein the aerogel particles (C) have a BET specific surface area of 300-1500 m$^2$/g, a porosity of 50% or more, and have superhydrophobicity with a water contact angle of 125° or more, and
   wherein the water-dispersed aerogel does not contain a surfactant,
   wherein the aerogel particles (C) remain dispersed in the mixture of water (A) and organic solvent (B) after at least 24 hours, and
   wherein a reduction in contact angle of the aerogel particles (C), upon drying from the water dispersed aerogel, is 50% or less compared to the aerogel particles (C), prior to inclusion in the water-dispersed aerogel.

10. The method of claim 9, wherein the aerogel particles (C) have a particle size ranging from 2 nm to 50 μm.

11. The method of claim 9, wherein the aerogel particles (C) have a BET specific surface area of 500-1500 m$^2$/g.

12. The method of claim 9, wherein the aerogel particles (C) have a porosity of 90% or more.

13. The method of claim 9, wherein the aerogel particles (C) are at least one selected from the group consisting of silica (SiO$_2$), alumina, carbon, and titania (TiO$_2$).

14. The method of claim 9, wherein the organic solvent (B) is at least one selected from the group consisting of methanol, ethanol, acetone, isopropyl alcohol (IPA), propanol, butanol, pentanol, octanol, and isomers thereof.

15. The method of claim 9, wherein the mixture of water (A) and organic solvent (B) comprises the water (A) and the organic solvent (B) at a weight ratio of 2:1-1:1.

16. The method of claim 9, wherein the reduction in contact angle of the water-dispersed aerogel is 10% or less.

17. The method of claim 9, wherein the aerogel particles (C) are contained in an amount of 10-25 parts by weight based on 100 parts by weight of the mixture of water (A) and organic solvent (B).

18. The water-dispersed aerogel of claim 1, wherein the aerogel particles (C) are contained in an amount of 10-25 parts by weight based on 100 parts by weight of the mixture of water (A) and organic solvent (B).

* * * * *